United States Patent
Yu et al.

(10) Patent No.: US 10,466,708 B2
(45) Date of Patent: Nov. 5, 2019

(54) METHOD FOR CONTROLLING WALK OF ROBOT, AND ROBOT

(71) Applicant: JIANGSU MIDEA CLEANING APPLIANCES CO., LTD., Jiangsu (CN)

(72) Inventors: Qinghao Yu, Jiangsu (CN); Yongzhe Piao, Jiangsu (CN); Qiang Shen, Jiangsu (CN)

( * ) Notice: Subject to any disclaimer, the term of this patent is extended or adjusted under 35 U.S.C. 154(b) by 0 days.

(21) Appl. No.: 15/120,437

(22) PCT Filed: Aug. 12, 2015

(86) PCT No.: PCT/CN2015/086791
§ 371 (c)(1),
(2) Date: Aug. 19, 2016

(87) PCT Pub. No.: WO2016/110097
PCT Pub. Date: Jul. 14, 2016

(65) Prior Publication Data
US 2017/0357266 A1    Dec. 14, 2017

(30) Foreign Application Priority Data

Jan. 8, 2015  (CN) .......................... 2015 1 0009036

(51) Int. Cl.
*G05D 1/02* (2006.01)
*A47L 9/28* (2006.01)
(Continued)

(52) U.S. Cl.
CPC .............. *G05D 1/0219* (2013.01); *A47L 9/28* (2013.01); *A47L 11/24* (2013.01);
(Continued)

(58) Field of Classification Search
CPC .............................. G05B 19/10; G05D 1/0219
See application file for complete search history.

(56) References Cited

U.S. PATENT DOCUMENTS

| | | | |
|---|---|---|---|
| 4,674,048 A * | 6/1987 | Okumura | ............... B25J 9/1676 |
| | | | 318/568.12 |
| 6,690,819 B1 * | 2/2004 | Teraji | ....................... G06K 9/32 |
| | | | 348/126 |

(Continued)

FOREIGN PATENT DOCUMENTS

| CN | 102083352 A | 6/2011 |
|---|---|---|
| CN | 102092048 A | 6/2011 |

(Continued)

OTHER PUBLICATIONS

PCT/CN2015/086791 English Translation of the International Search Report, dated Nov. 2, 2015, 4 pages.
(Continued)

*Primary Examiner* — Alex C Dunn
(74) *Attorney, Agent, or Firm* — Kilpatrick Townsend & Stockton

(57) ABSTRACT

A method for controlling a walk of a robot and robot are provided. The method includes: controlling the robot to walk along walls of a room to obtain a structure and size of the room; dividing an area of the room into a plurality of regular sweeping areas and a plurality of irregular sweeping areas according to the structure and size of the room; controlling the robot to sweep the plurality of regular sweeping areas in a clip shaped sweeping walk mode; and controlling the robot to sweep each irregular sweeping area according to a size of each irregular sweeping area after sweeping the plurality of regular sweeping areas. The robot cleans the regular cleaning areas and the irregular cleaning areas separately, thus increasing a cleaning coverage rate, and effectively improving cleaning performance and user experiences.

11 Claims, 3 Drawing Sheets

(51) Int. Cl.
*A47L 11/24* (2006.01)
*A47L 11/40* (2006.01)

(52) U.S. Cl.
CPC ............ *A47L 11/4011* (2013.01); *G05D 1/02* (2013.01); *A47L 2201/04* (2013.01); *G05D 2201/0203* (2013.01)

(56) References Cited

U.S. PATENT DOCUMENTS

| | | | | |
|---|---|---|---|---|
| 7,933,686 B2* | 4/2011 | Myeong | ............... | G05D 1/0219 340/5.71 |
| 9,207,678 B2* | 12/2015 | Kim | ............... | G05D 1/0246 |
| 2004/0021439 A1* | 2/2004 | Porat | ............... | E04H 4/1654 318/567 |
| 2006/0190135 A1* | 8/2006 | Lee | ............... | G05D 1/0219 700/245 |
| 2008/0021317 A1* | 1/2008 | Sumanaweera | ...... | A61B 8/4218 600/437 |
| 2012/0158176 A1* | 6/2012 | Park | ............... | B25J 5/007 700/248 |
| 2012/0232738 A1 | 9/2012 | Jeon | | |
| 2015/0251318 A1* | 9/2015 | Lv | ............... | A47L 9/009 180/8.1 |

FOREIGN PATENT DOCUMENTS

| | | |
|---|---|---|
| CN | 102846273 A | 1/2013 |
| CN | 103099583 A | 5/2013 |
| CN | 103705178 A | 4/2014 |
| EP | 1715399 A2 | 10/2006 |
| EP | 2502539 A2 | 9/2012 |
| EP | 2720102 A2 | 4/2014 |
| JP | 2005110911 A | 4/2005 |
| WO | WO 2009132317 A1 | 10/2009 |

OTHER PUBLICATIONS

European Patent Application No. 15876601.4, Extended Search and Opinion, dated Aug. 1, 2018, 9 pp.

\* cited by examiner

METHOD FOR CONTROLLING WALK OF ROBOT, AND ROBOT

CROSS-REFERENCE TO RELATED APPLICATIONS

This application is a US national phase application based up an International Application No. PCT/CN2015/086791, filed on Aug. 12, 2015, which is based on and claims priority to Chinese Patent Application No. 201510009036.0, filed on Jan. 8, 2015, the entire contents of which are incorporated herein by reference.

FIELD

The present disclosure relates to the field of robot technology, and more particularly to a method for controlling a walk of a robot and a robot.

BACKGROUND

With the rapid development of intelligent robotic, more and more intelligent cleaners enter into users' home, thereby largely improving comfort and convenience of the live. When selecting and purchasing the intelligent cleaners, the user focuses on intelligence and cleaning efficiency of the product. Further, the walk method of the intelligent cleaner is a key technology of the cleaning system and of the intelligence.

At present, the walk modes of the intelligent cleaners in sale include a random walk mode, an S-shaped walk mode, a spiral walk mode, a designated area sweeping mode and the like. However, a coverage rate corresponding to the walk mode in the related art is low such that sweeping is not complete, thereby making poor user experience.

SUMMARY

Embodiments of the present disclosure provide a method for controlling a walk of a robot. The method includes: controlling the robot to walk along walls of a room to obtain a structure and size of the room; dividing an area of the room into a plurality of regular sweeping areas and a plurality of irregular sweeping areas according to the structure and size of the room; controlling the robot to sweep the plurality of regular sweeping areas in a clip shaped sweeping walk mode; and controlling the robot to sweep each irregular sweeping area according to a size of each irregular sweeping area after sweeping the plurality of regular sweeping areas.

Embodiments of the present disclosure provide a robot. The robot includes: a body; a control component, disposed on the body, and configured to: control the robot to walk along walls of a room to obtain a structure and size of the room; divide an area of the room into a plurality of regular sweeping areas and a plurality of irregular sweeping areas according to the structure and size of the room; and control the robot to sweep the plurality of regular sweeping areas in a clip shaped sweeping walk mode, and to control the robot to sweep each irregular sweeping area according to a size of each irregular sweeping area after sweeping the plurality of regular sweeping areas.

Embodiments of the present disclosure provide a non-transitory computer-readable storage medium. The non-transitory computer-readable storage medium has stored therein instructions that, when executed by a processor of a device, causes the device to perform a method for controlling a walk of a robot, in which the method includes: controlling the robot to walk along walls of a room to obtain a structure and size of the room; dividing an area of the room into a plurality of regular sweeping areas and a plurality of irregular sweeping areas according to the structure and size of the room; controlling the robot to sweep the plurality of regular sweeping areas in a clip shaped sweeping walk mode; and controlling the robot to sweep each irregular sweeping area according to a size of each irregular sweeping area after sweeping the plurality of regular sweeping areas.

Figure 1:
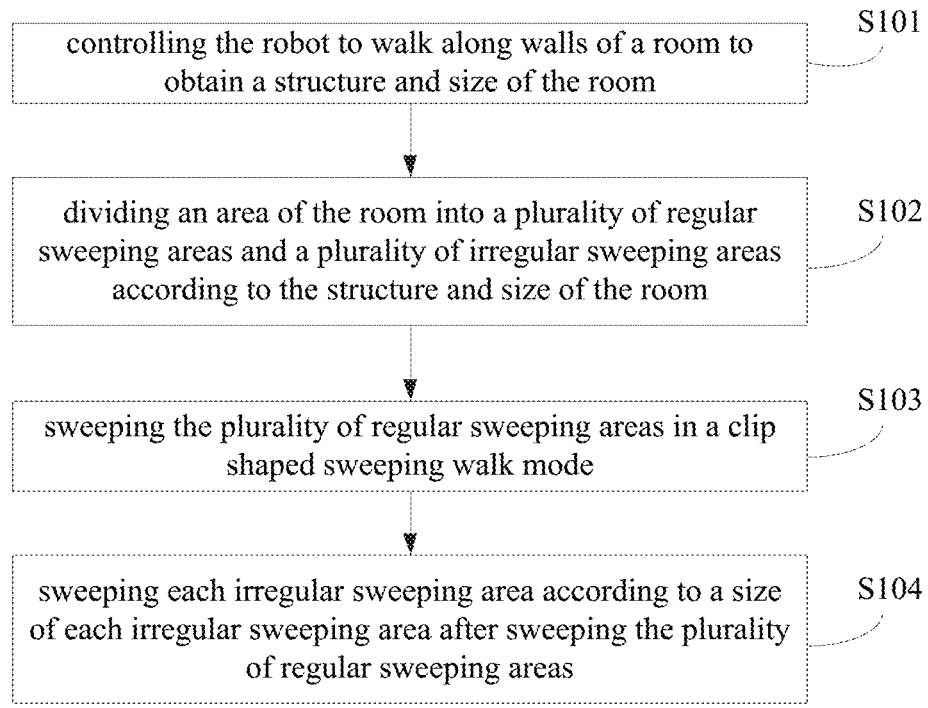
FIG. 1 is a flow chart of a method for controlling a walk of a robot according to an embodiment of the present disclosure.

ELEMENTS LIST an obtaining module 100, a dividing module 200 and a controlling module 300.

DETAILED DESCRIPTION

Embodiments of the present disclosure will be described in details in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

In order to increase the sweeping coverage rate of the intelligence cleaner, embodiments of the present disclosure provide a method for controlling a walk of a robot and a robot, which will be described with reference to drawings as follows.

FIG. 1 is a flow chart of a method for controlling a walk of a robot according to an embodiment of the present disclosure. As shown in FIG. 1, the method for controlling a walk of a robot may include followings.

In 101, the robot is controlled to walk along walls of a room to obtain a structure and size of the room.

Figure 2:
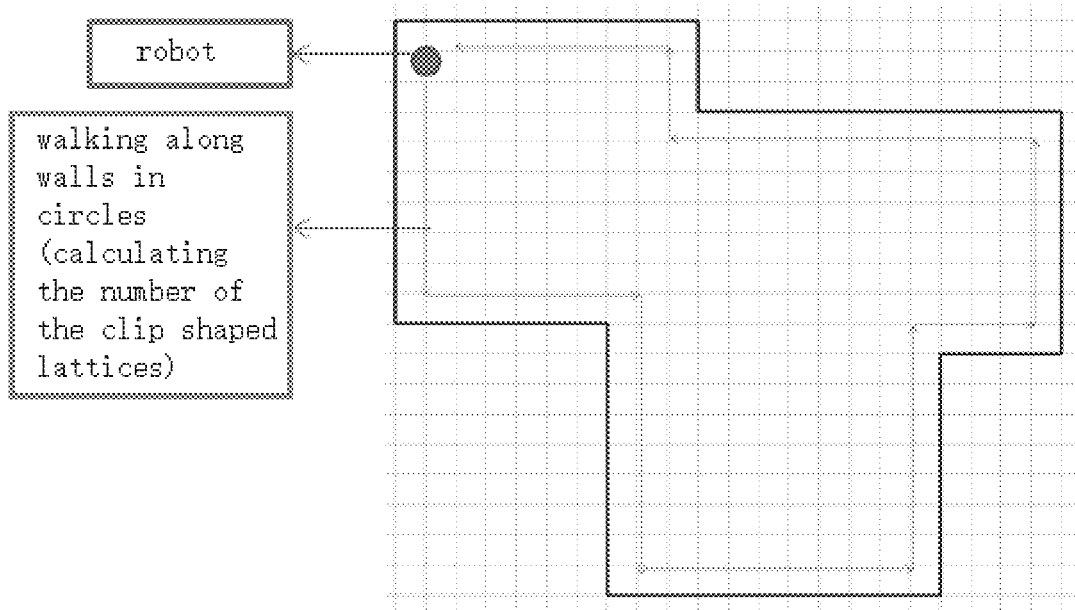
FIG. 2 is a schematic diagram showing a room according to an embodiment of the present disclosure.

Specifically, the room is shown in FIG. 2. The robot is controlled to walk in circles along the walls of the room to obtain the structure and size of the room. A map of the room is stored in a memory of the robot when the robot is controlled to walk in circles.

In 102, an area of the room is divided into a plurality of regular sweeping areas and a plurality of irregular sweeping areas according to the structure and size of the room.

Figure 3:
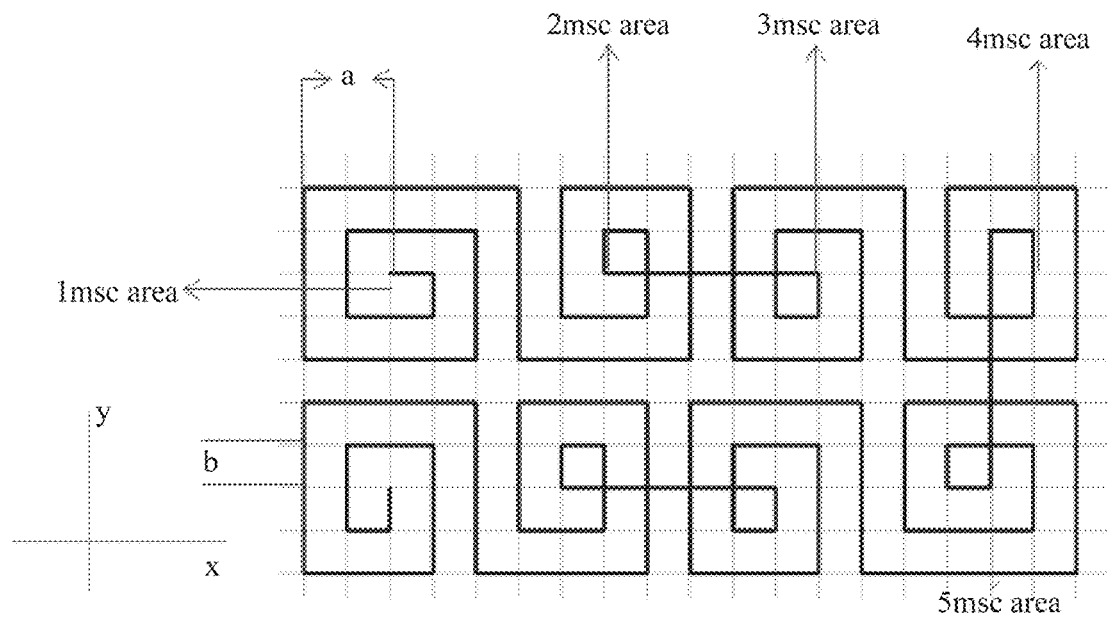
FIG. 3 is a schematic diagram showing a plurality of regular sweeping areas according to an embodiment of the present disclosure.

Specifically, as the robot walks mainly in clip shaped when sweeping, the number of clip shaped lattices formed by dividing the area of the room is calculated according to the structure and size of the room obtained when the robot is controlled to walk in circles. As shown in FIG. 3, for example, the number of circles in which the robot is controlled to walk is in a range of 1 to 3. If the number of the clip shaped lattices is calculated before the third circle is completed, the robot may be controlled to stop walking in circles. Assuming that the size of a regular sweeping area is n×m, the areas with the size less than n×m may be defined as the irregular sweeping areas. For example, if the size of an area is ⅔×n×m or ⅓×n×m, each of them may be defined as the irregular sweeping area. The sweeping mode of the regular sweeping area is distinguished with that of the irregular sweeping area subsequently.

In an embodiment of the present disclosure, the plurality of regular sweeping areas have a same size, i.e. the size of each clip shaped lattice is equal to n×m.

In S103, the robot is control to sweep the plurality of regular sweeping areas in a clip shaped sweeping walk mode.

Specifically, the robot starts to sweep according to information learned in advance from the process of walking in circles, that is, the robot is controlled to sweep in the clip shaped sweeping walk mode the areas with the size of n×m from the starting point.

In an embodiment of the present disclosure, the clip shaped sweeping walk mode may include a spiral walk mode for sweeping the regular sweeping area and an S-shaped walk mode for walking between different regular sweeping areas. In another embodiment of the present disclosure, the clip shaped sweeping walk mode may include a spiral walk mode for sweeping the regular sweeping area and a straight line walk mode for walking between different regular sweeping areas.

Specifically, as shown in FIG. 3, the clip shaped sweeping walk mode includes the spiral walk mode for sweeping the regular sweeping area. The spiral walk mode may be switched between a diffusion sweeping walk mode (for example, for the 1 msc area and the 3 msc area) and a contraction sweeping walk mode (such as, for the 2 msc area and the 4 msc area). For example, as shown in FIG. 3, after sweeping the 1 msc area, the value of a may be recorded. And then, the 2 msc area adjacent to the 1 msc area may be swept and the value of 2×a may be recorded at the center point of the 2 msc area (the value of 2×a corresponds to the distance from the center of the 2 msc area to the center of the 3 msc area such that the value of 2×a needed to be calculated at the center point of the 2 msc area). If the 2 msc area is swept in the contraction sweeping walk mode by the robot, the robot may move in the direction of 180° into the next sweeping area, i.e. the 3 msc area. The 3 msc area may be swept in the diffusion sweeping walk mode by the robot. The subsequent operation of sweeping may be performed successively to the 4 msc area, the 5 msc area and the like. The robot may move in the direction of 180° into the 4 msc area from the 3 msc area and may move in the direction of 90° into the 5 msc area from the 4 msc area. The direction of 180° is the coordinate direction of x and the direction of 90° is the coordinate direction of y, shown in FIG. 3.

Further specifically, as shown in FIG. 3, for the different regular sweeping areas, the robot may walk between them in the S-shaped walk mode or in the straight line walk mode.

In an embodiment of the present disclosure, a parameter of the clip shaped sweeping walk mode is determined according to a sweeping length of a rolling brush of the robot.

Specifically, as shown in FIG. 3, b represents the parameter of the clip shaped sweeping walk mode, i.e. the sweeping interval. If the length of robot's rolling brush is L, the value of b may be set as 90%×L such that there are overlaps between the sweeping areas, thereby enhancing the sweeping performance.

In S104, after sweeping the plurality of regular sweeping areas, the robot is controlled to sweep each irregular sweeping area according to a size of each irregular sweeping area.

Figure 4:
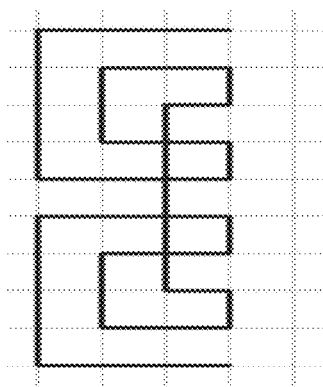
FIG. 4 is a schematic diagram showing a walk path of sweeping an irregular sweeping area according to an embodiment of the present disclosure.
Figure 5:
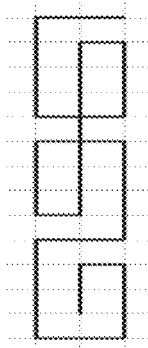
FIG. 5 is a schematic diagram showing a walk path of sweeping another irregular sweeping area according to an embodiment of the present disclosure.

Specifically, after sweeping the plurality of regular sweeping areas, according to the initial obtained information and the drawn map during the process of sweeping, the robot may move into the areas without sweeping, i.e. the irregular sweeping areas, and may sweep each irregular area according to the size of each irregular sweeping area. For example, as shown in FIG. 4, the size of the irregular sweeping area is ⅔×n×m, and this area may be swept in the sweeping walk mode shown in FIG. 4; and as shown in FIG. 5, the size of the irregular sweeping area is ⅓×n×m, and this area may be swept in the sweeping walk mode shown in FIG. 5.

The method for controlling a walk of a robot according to embodiments of the present disclosure, firstly, by controlling the robot to walk along the walls of the room to obtain the structure and size of the room, and by dividing the area of the room into a plurality of regular sweeping areas and a plurality of irregular sweeping areas, and then by controlling the robot to sweep all regular sweeping areas in the clip shaped sweeping walk mode, afterwards, by controlling the robot to sweep each irregular sweeping area according to the size of each irregular sweeping area, may distinguish the regular sweeping areas and the irregular sweeping areas to sweep, and may largely increase the sweeping coverage rate, and also may effectively enhance the sweeping performance, thereby improving the user experience.

In an embodiment of the present disclosure, the method for controlling a walk of a robot further includes: judging whether a next sweeping area along the direction in which the robot is walking is the regular sweeping area after sweeping a current regular sweeping area; controlling the robot to move along the direction in which the robot is walking into the next sweeping area if it is judged as the regular sweeping area; and controlling the robot to turn the direction if it is judged as the irregular sweeping area.

Specifically, as shown in FIG. 3, for example, if the current regular sweeping area is the 2 msc area, it is judged whether the next sweeping area along the direction in which the robot walking is the regular sweeping area. If it is judged as the regular sweeping area, the robot may be controlled to move along the direction in which the robot is walking into the next sweeping area, i.e. move to the 3 msc area. Taking another example, if the current regular sweeping area is the 4 msc area, it is judged whether the next sweeping area along the direction in which the robot walking is the regular sweeping area after sweeping the 4 msc area. If there is an obstacle or a wall on the right side of the 4 msc area, or the size of the area that is formed with the right side of the 4 msc area and the wall is less than n×m, i.e. the next sweeping area is the irregular sweeping area, the robot may be controlled to turn the direction, for example, the robot is controlled to turn by 90° to move into the 5 msc area. In addition, if the robot is controlled to turn the direction, and the next sweeping area is still the irregular sweeping area, the robot may be still controlled to turn the direction until the robot moves into the regular sweeping area.

In order to achieve the above embodiments, embodiments of the present disclosure provide a robot.

Figure 6:
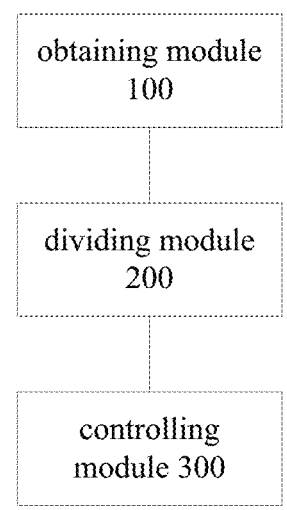
FIG. 6 is a block diagram of a robot according to an embodiment of the present disclosure.

FIG. 6 is a block diagram of a robot according to an embodiment of the present disclosure. As shown in FIG. 6, the robot includes an obtaining module 100, a dividing module 200 and a controlling module 300.

The obtaining module 100 is configured to control the robot to walk along walls of a room to obtain a structure and size of the room.

Specifically, the room is shown in FIG. 2. The obtaining module 100 is configured to control the robot to walk along the walls of the room in circles to obtain the structure and size of the room. The obtaining module 100 is further configured to store a map of the room in a memory of the robot when the robot is controlled to walk in circles.

The dividing module 200 is configured to divide an area of the room into a plurality of regular sweeping areas and a plurality of irregular sweeping areas according to the structure and size of the room.

Specifically, as the robot walks mainly in clip shaped when sweeping, the dividing module 200 may calculate the number of clip shaped lattices formed by dividing the area of the room according to the structure and size of the room obtained when the robot is controlled to walk in circles. As shown in FIG. 3, for example, the number of circles in which the robot is controlled to walk is in a range of 1 to 3. If the number of the clip shaped lattices is calculated before the third circle is completed, the obtaining module 100 may control the robot to stop walking in circles. Assuming that the size of a regular sweeping area is n×m, the areas with the size less than n×m may be defined as the irregular sweeping areas. For example, if the size of an area is ⅔×n×m or ⅓×n×m, each of them may be defined as the irregular sweeping area. The sweeping mode of the regular sweeping area is distinguished with that of the irregular sweeping area subsequently.

In an embodiment of the present disclosure, the plurality of regular sweeping areas have a same size, i.e. the size of each clip shaped lattice is equal to n×m.

The controlling module 300 is configured to control the robot to sweep the plurality of regular sweeping areas in a clip shaped sweeping walk mode, to control the robot to sweep each irregular sweeping area according to a size of each irregular sweeping area after sweeping the plurality of regular sweeping areas.

Specifically, after dividing the area of the room into the plurality of regular sweeping areas and the plurality of irregular sweeping areas, the controlling module 300 control the robot to sweep in the clip shaped sweeping walk mode the areas with the size of n×m from the starting point.

In an embodiment of the present disclosure, the clip shaped sweeping walk mode may include a spiral walk mode for sweeping the regular sweeping areas and an S-shaped walk mode for walking between different regular sweeping areas. In another embodiment of the present disclosure, the clip shaped sweeping walk mode may include a spiral walk mode for sweeping the regular sweeping area and a straight line walk mode for walking between different regular sweeping areas.

Specifically, as shown in FIG. 3, the controlling module 300 may control the robot to sweep the regular sweeping areas in the spiral walk mode. The spiral walk mode may be switched between a diffusion sweeping walk mode (for example, for the 1 msc area and the 3 msc area) and a contraction sweeping walk mode (such as, for the 2 msc area and the 4 msc area). For example, as shown in FIG. 3, after sweeping the 1 msc area, the value of a may be recorded. And then, the 2 msc area adjacent to the 1 msc area may be swept and the value of 2×a may be recorded at the center point of the 2 msc area (the value of 2×a corresponds to the distance from the center of the 2 msc area to the center of the 3 msc area such that the value of 2×a needed to be calculated at the center point of the 2 msc area). If the 2 msc area is swept in the contraction walking sweeping mode by the robot, the robot may move in the direction of 180° into the next sweeping area, i.e. the 3 msc area. The 3 msc area may be swept in the diffusion walking sweeping mode by the robot. The subsequent operation of sweeping is performed successively to the 4 msc area, the 5 msc area or the like. The robot may move in the direction of 180° into the 4 msc area from the 3 msc area and may move in the direction of 90° into the 5 msc area from the 4 msc area. The direction of 180° is the coordinate direction of x and the direction of 90° is the coordinate direction of y, shown in FIG. 3.

Further specifically, as shown in FIG. 3, for the different regular sweeping areas, the controlling module 300 may control the robot to walk between them in the S-shaped walk mode or in the straight line walk mode.

In an embodiment of the present disclosure, a parameter of the clip shaped sweeping walk mode is determined according to a sweeping length of a rolling brush of the robot.

Specifically, as shown in FIG. 3, b represents the parameter of the clip shaped sweeping walk mode, i.e. the sweeping interval. If the length of robot's rolling brush is L, the value of b may be set as 90%×L such that there are overlaps between the sweeping areas, thereby enhancing the sweeping performance.

Furthermore, after sweeping the plurality of regular sweeping areas, the controlling module 300 may control the robot to sweep each irregular sweeping area according to the size of each irregular sweeping area. For example, as shown in FIG. 4, the size of the irregular sweeping area is ⅔×n×m such that the controlling module 300 may control the robot to sweep the irregular sweeping area in the sweeping walk mode shown in FIG. 4; and as shown in FIG. 5, the size of the irregular sweeping area is ⅓×n×m such that the controlling module 300 may control the robot to sweep the irregular sweeping area in the sweeping walk mode shown in FIG. 5.

The robot according to embodiments of the present disclosure, firstly, by controlling the robot to walk along the walls of the room to obtain the structure and size of the room via the obtaining module and by dividing the area of the room into a plurality of regular sweeping areas and a plurality of irregular sweeping areas via the dividing module, and then by controlling the robot to sweep all regular sweeping areas in the clip shaped sweeping walk mode via the controlling module, afterwards, by controlling the robot to sweep each irregular sweeping area according to the size of each irregular sweeping area, may distinguish the regular sweeping areas and the irregular sweeping areas to sweep, and may largely increase the sweeping coverage rate, and also may effectively enhance the sweeping performance, thereby improving the user experience.

In an embodiment of the present disclosure, the controlling module 300 is further configured to: judge whether a next sweeping area along a direction in which the robot is walking is the regular sweeping area after sweeping a current regular sweeping area; control the robot to move along the direction in which the robot is walking into the next sweeping area if it is judged as the regular sweeping area; and control the robot to turn the direction if it is judged as the irregular sweeping area.

Specifically, as shown in FIG. 3, for example, if the current regular sweeping area is the 2 msc area, the controlling module may judge whether the next sweeping area along the direction in which the robot walking is the regular sweeping area. If it is judged as the regular sweeping area, the robot may be controlled to move along the direction in which the robot is walking into the next sweeping area, i.e. move to the 3 msc area. Taking another example, if the current regular sweeping area is the 4 msc area, the controlling module 300 may judge whether the next sweeping area along the direction in which the robot walking is the regular sweeping area after sweeping the 4 msc sweeping area. If there is an obstacle or a wall on the right side of the 4 msc area, or the size of the area that is formed with the right side of the 4 msc area and the wall is less than n×m, i.e. the next sweeping area is the irregular sweeping area, the robot may be controlled to turn the direction, for example, the robot is controlled to turn by 90° to move into the 5 msc area. In addition, if the robot is controlled to turn the direction, and the next sweeping area is still the irregular sweeping area, the robot may be still controlled to turn the direction until the robot moves in the regular sweeping area.

Embodiments of the present disclosure provide a computer program, when executing on a processor, performs the method according to any one of the above embodiments.

According to embodiments of the present disclosure, a non-transitory computer-readable storage medium is provided. The non-transitory computer-readable storage medium has stored therein instructions that, when executed by a processor of a device, causes the device to perform the above method for controlling a walk of a robot, which will not be elaborated herein.

It should be understood that, terms such as "center", "longitudinal", "lateral", "length", "width", "thickness", "over", "below", "front", "back", "left", "right", "vertical", "horizontal", "top", "bottom", "in", "out", "clockwise", "anti-clockwise", "axial", "radial" and "circumference" refer to the directions and location relations which are the directions and location relations shown in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure.

In addition, in the description of the present disclosure, terms such as "first" and "second" are used herein for purposes of description and are not intended to indicate or imply relative importance or significance. Furthermore, in the description of the present disclosure, "a plurality of" refers to two or more unless otherwise specified.

It should be understood that, unless specified or limited otherwise, the terms "mounted," "connected," and "coupled" and variations thereof are used broadly and encompass such as fixed or detachable mountings, connections and couplings, and can be mechanical or electrical mountings, connections and couplings, and also can be direct and via media indirect mountings, connections and couplings, and further can be inner mountings, connections and couplings of two components or interaction relations between two components, unless otherwise specified, which can be understood by those skilled in the art according to the detail embodiment of the present disclosure.

In the description of the present disclosure, unless specified or limited otherwise, the first characteristic is "on" or "under" the second characteristic refers to the first characteristic and the second characteristic can be direct or via media indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A robot, comprising:
a body;
a control component, disposed on the body, and configured to:
control the robot to walk along walls of a room to obtain a structure and size of the room;
divide an area of the room into a plurality of regular sweeping areas and a plurality of irregular sweeping areas according to the structure and size of the room, wherein a size of the irregular sweeping area is less than a size of the regular sweeping area;
control the robot to sweep the plurality of regular sweeping areas in a clip shaped sweeping walk mode, wherein the clip shaped sweeping walk mode comprises a spiral walk mode for sweeping the regular sweeping area and an S-shaped walk mode for walking between different regular sweeping areas, or the clip shaped sweeping walk mode comprises a spiral walk mode for sweeping the regular sweeping area and a straight line walk mode for walking between different regular sweeping areas; and
control the robot to sweep each irregular sweeping area according to the size of each irregular sweeping area after sweeping the plurality of regular sweeping areas.

2. The robot according to claim 1, wherein the plurality of regular sweeping areas have a same size.

3. The robot according to claim 1, wherein the control component is further configured to:
judge whether a next sweeping area along a direction in which the robot is walking is the regular sweeping area after sweeping a current regular sweeping area, control the robot to move along the direction in which the robot is walking into the next sweeping area if it is judged as the regular sweeping area, and control the robot to turn the direction if it is judged not as the regular sweeping area.

4. The robot according to claim 1, wherein, a parameter of the clip shaped sweeping walk mode is determined according to a sweeping length of a rolling brush of the robot.

5. The robot according to claim 1, wherein the spiral walk mode comprises a diffusion sweeping walk mode and a contraction sweeping walk mode.

6. The robot according to claim 5, wherein a walk from a regular sweeping area swept according to the diffusion sweeping walk mode to a regular sweeping area swept according to the contraction sweeping walk mode is switched by the S-shaped walk mode, and
a walk from a regular sweeping area swept according to the contraction sweeping walk mode to a regular sweeping area swept according to the diffusion sweeping walk mode is switched by the straight line walk mode.

7. A non-transitory computer-readable storage medium having stored therein instructions that, when executed by a processor of a device, causes the device to perform a method for controlling a walk of a robot, wherein the method comprises:
controlling the robot to walk along walls of a room to obtain a structure and size of the room;
dividing an area of the room into a plurality of regular sweeping areas and a plurality of irregular sweeping areas according to the structure and size of the room, wherein a size of the irregular sweeping area is less than a size of the regular sweeping area;
controlling the robot to sweep the plurality of regular sweeping areas in a clip shaped sweeping walk mode, wherein the clip shaped sweeping walk mode comprises a spiral walk mode for sweeping the regular sweeping area and an S-shaped walk mode for walking between different regular sweeping areas, and the clip shaped sweeping walk mode comprises a spiral walk mode for sweeping the regular sweeping area and a straight line walk mode for walking between different regular sweeping areas; and
controlling the robot to sweep each irregular sweeping area according to the size of each irregular sweeping area after sweeping the plurality of regular sweeping areas.

8. The non-transitory computer-readable storage medium according to claim 7, wherein the spiral walk mode comprises a diffusion sweeping walk mode and a contraction sweeping walk mode.

9. The non-transitory computer-readable storage medium according to claim 8, wherein a walk from a regular sweeping area swept according to the diffusion sweeping walk mode to a regular sweeping area swept according to the contraction sweeping walk mode is switched by the S-shaped walk mode, and
a walk from a regular sweeping area swept according to the contraction sweeping walk mode to a regular sweeping area swept according to the diffusion sweeping walk mode is switched by the straight line walk mode.

10. The non-transitory computer-readable storage medium according to claim 7, wherein the plurality of regular sweeping areas have a same size.

11. The non-transitory computer-readable storage medium according to claim 7, wherein the method further comprises:
judging whether a next sweeping area along a direction in which the robot is walking is the regular sweeping area after sweeping a current regular sweeping area;
controlling the robot to move along the direction in which the robot is walking into the next sweeping area if it is judged as the regular sweeping area; and
controlling the robot to turn the direction if it is judged as the irregular sweeping area.

* * * * *